July 2, 1946.  R. B. DAY  2,403,342
CONVERSION OF HYDROCARBONS
Filed Feb. 11, 1944
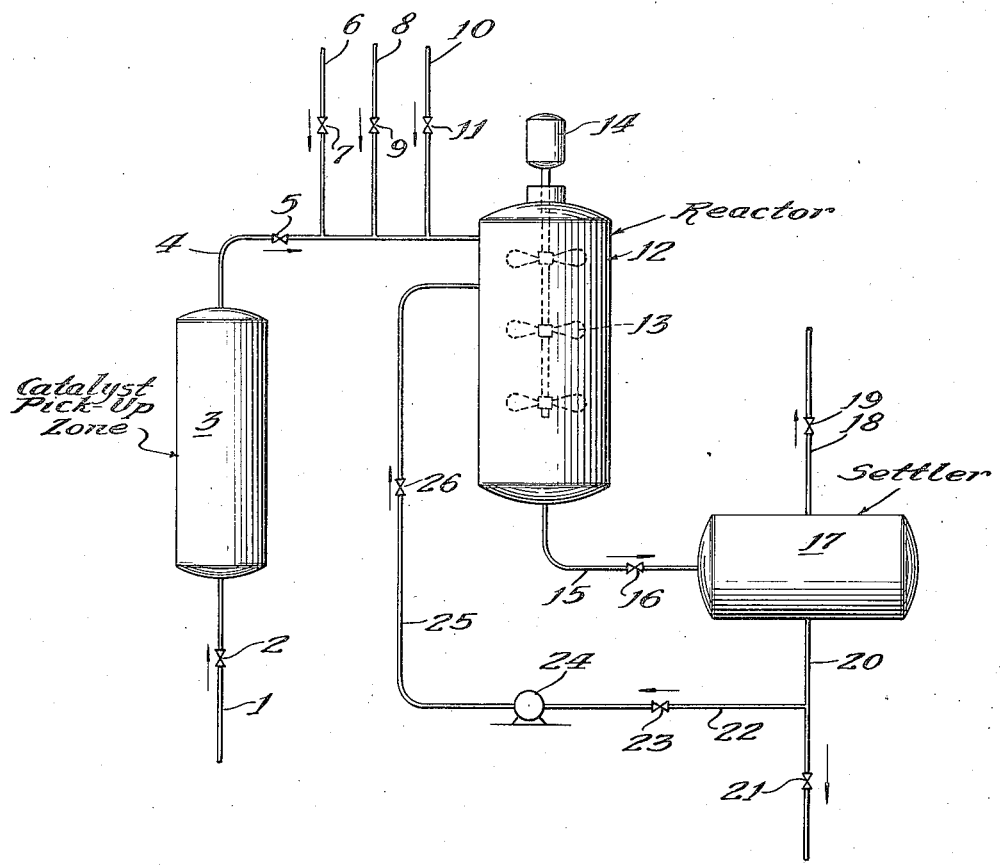
Inventor:
Roland B. Day
By: Lee J. Gary
Attorney Patented July 2, 1946

2,403,342

UNITED STATES PATENT OFFICE 2,403,342

CONVERSION OF HYDROCARBONS

Roland B. Day, Riverside, Ill., assignor to Universal Oil Products Company, Chicago, Ill., a corporation of Delaware Application February 11, 1944, Serial No. 521,929

2 Claims. (Cl. 260—683.4)

This invention relates to the conversion of hydrocarbons and more particularly to a process for reacting an alkylatable paraffinic hydrocarbon with an olefinic hydrocarbon and concurrently therewith isomerizing a higher boiling, normally liquid paraffinic hydrocarbon.

In a broad aspect the present invention relates to a hydrocarbon conversion process which comprises reacting an alkylatable paraffinic hydrocarbon with an olefinic hydrocarbon in the presence of a catalyst having alkylating and isomerizing properties and simultaneously isomerizing an isomerizable paraffinic hydrocarbon of less branching and of a greater number of carbon atoms per molecule than said alkylatable paraffinic hydrocarbon.

In one specific embodiment the present invention relates to a hydrocarbon conversion process which comprises alkylating isobutane with ethylene and concurrently therewith isomerizing a pentane-hexane fraction of straight run gasoline in the presence of a catalyst having alkylating and isomerizing properties and a catalyst promoter at a temperature of from about 100 to about 350° F.

In accordance with the invention, an alkylatable paraffinic hydrocarbon, which may comprise an isoparaffinic hydrocarbon and particularly isobutane or isopentane, is reacted with an olefinic hydrocarbon, which may be either normally gaseous and thus may comprise ethylene, propylene or butylene, or normally liquid, such as amylenes, hexenes, olefinic polymers, etc. The process is particularly applicable to the alkylation of isobutane by ethylene in order to produce branched chain hexane and particularly 2,3-dimethylbutane.

Concurrently with the reaction of the isoparaffinic and olefinic hydrocarbons, an isomerizable paraffinic hydrocarbon which is of less branching than said isoparaffinic hydrocarbon and which contains a greater number of carbon atoms per molecule, is subjected to isomerization. In this way, straight or mildly branched paraffinic hydrocarbons are converted into more highly branched paraffinic hydrocarbons. Thus, selected fractions of straight run gasolines, such as those containing normal pentane, hexane, heptane, octane, etc., or mixtures thereof, may be reformed into high octane saturated gasoline fractions which are particularly suitable for use in aviation gasoline.

Any suitable catalyst having alkylating and isomerizing properties may be employed and thus may comprise a metal halide catalyst of the Friedel-Crafts type or mixtures thereof and preferably aluminum chloride. The metal halide catalysts are normally employed in conjunction with a catalyst promoter which usually comprises a hydrogen halide or a halogen compound which functions as a catalyst promoter under the conditions of treatment. When using aluminum chloride catalyst, hydrogen chloride is normally introduced as the catalyst promoter and either functions as such or is converted into an alkyl chloride which acts accordingly. For example, in the alkylation of isobutane with ethylene, it has been found that the ethylene reacts with the hydrogen chloride to form ethyl chloride and that the ethyl chloride satisfactorily functions as a catalyst promoter. Another suitable catalyst may comprise a mixture of boron fluoride and hydrogen fluoride.

The process of the present invention may be effected at a temperature within the range of from about 100° to about 350° F. and preferably within the range of from about 150° to about 300° F. It is preferred that a substantial proportion of the reactants are in liquid phase and sufficient pressure should therefore be utilized in order to accomplish this. The pressure thus may range from about 50 to 500 pounds or more and preferably is within the range of from about 200 to about 400 pounds. The temperature and pressure conditions herein set forth are satisfactory for the alkylation of isobutane or isopentane with ethylene, propylene and/or butylene and the simultaneous isomerization of pentane, hexane, heptane and/or octane in the presence of aluminum chloride catalyst in conjunction with hydrogen chloride. It is understood, however, that the broad scope of the present invention is not so limited, and that the conditions of operation may have to be modified when different charging stocks are employed and also when other catalysts are utilized. The other metal halide catalysts of the Friedel-Crafts type are usually less active than aluminum chloride and in general will require more severe conditions of treatment.

The present invention may be effected in any suitable type of apparatus in which the reactants are intimately contacted with the catalyst under the desired conditions of treatment. One suitable method is illustrated in the accompanying flow diagram, but it is understood that the broad scope of the invention is not limited to this particular method of operation.

In the interest of simplicity, the following description will be restricted to a process for the alkylation of isobutane with ethylene and the isomerization of a pentane-hexane fraction of straight run gasoline in the presence of an aluminum chloride catalyst in conjunction with hydrogen chloride.

Referring to the drawing, isobutane may be introduced to the process at the desired temperature and pressure, through line 1 and valve 2 into catalyst pick-up zone 3. Zone 3 contains a bulk supply of aluminum chloride and a regulated portion thereof is carried over with the isobutane and withdrawn from the upper portion of zone 3 through line 4 containing valve 5. Hydrogen chloride may be introduced through line 6 containing valve 7, while the pentane-hexane fraction may be introduced through line 8 containing valve 9, and ethylene may be introduced through line 10 containing valve 11. The amount of hydrogen chloride so introduced will usually be about 1 to about 15%. The ethylene will usually be contained in admixture with ethane, but the amount of olefins so introduced will usually be of the order of 5 to 25% of the isobutane introduced to the reaction zone, so that there will be an excess of isoparaffins present in the reaction zone to thereby minimize undesirable polymerization reactions. The reactants are directed by way of line 4 into reactor 12. It is understood that the hydrogen chloride, ethylene or pentane-hexane fraction may be introduced to reactor 12 in any other suitable method and also, when desired, that the pentane-hexane fraction may be utilized to pick up and carry the catalyst from zone 3 into reactor 12, in which case the isobutane may be supplied directly to reactor 12 by well known means not illustrated.

As another advantage of the present process, any olefinic hydrocarbons which may be contained in the pentane-hexane fraction will react with the isobutane or other isoparaffinic hydrocarbons present in this zone, and thereby will produce a final product which is substantially free of olefinic hydrocarbons and will be particularly suitable for use in aviation gasoline. In addition to the reaction of isobutane with ethylene and the isomerization of the pentane-hexane fraction, these reactants may also undergo other reactions among themselves so that the final product is highly branched and exceptionally valuable.

In the case here illustrated, reactor 12 comprises a mechanically agitated zone containing stirring device 13 operated by motor 14. When desired, zone 12 may be equipped with suitable cooling means, not shown, in order to control the exothermic heat of reaction.

The reaction mixture from zone 12 is directed through line 15 containing valve 16 to settler 17, in which a hydrocarbon layer separates from a catalyst layer. The hydrocarbon layer may be withdrawn through line 18 and valve 19 and then is directed to suitable fractionating and separating means, not illustrated, in order to recover the desired products and to separate unconverted fractions for recycling, such as excess isobutane, hydrogen chloride, etc. Since the fractionation and separation equipment is conventional and since no novelty is claimed herein for it per se, it has been omitted from the drawing in the interest of simplicity.

The catalyst layer withdrawn from the lower portion of settler 17 may be removed from the process, all or in part, through line 20 and valve 21, but preferably at least a portion thereof is recycled by way of line 22, valve 23, pump 24, line 25 and valve 26 to reactor 12. A preferred type of operation is the so-called "sludge" type in which a hydrocarbon-aluminum chloride complex is used as the primary catalyst and, in such an operation, a major portion of the catalyst layer from settler 17 is recycled to reactor 12.

As heretofore set forth, the drawing illustrates one satisfactory method of operation. Another satisfactory, but not necessarily equivalent, method may comprise an operation in which reactor 12 is packed with a suitable adsorbent material, such as alumina, and the catalyst carried over from zone 3 is deposited on the packing. Still another operation may use a pool of aluminum chloride introduced into the reactor by any suitable means. In still another operation, a previously prepared solid catalyst may be deposited in the reactor before charging the reactants thereto.

The following example further illustrates the novelty and utility of the present invention but not with the intention of unduly limiting the same.

A charging mixture comprising 40% isobutane, 8% ethylene, 25% of a pentane-hexane fraction, and 4% of hydrogen chloride, the remainder comprising other constituents normally present with the ethylene and isobutane fractions, may be subjected to conversion in the presence of an aluminum chloride catalyst at a temperature of 175° F. and a pressure of about 300 pounds per square inch to produce a final product consisting of substantial amounts of 2,3-dimethylbutane, isohexane and isopentane. This product will be substantially saturated and of high antiknock properties and, therefore, is particularly suitable for use in aviation gasoline.

I claim as my invention:

1. In the alkylation of isobutane with ethylene in a reaction zone in the presence of a Friedel-Crafts type catalyst, the improvement which comprises introducing to said zone simultaneously with the isobutane a normally liquid predominantly paraffinic straight-run gasoline fraction containing a normal paraffin of at least 5 carbon atoms to the molecule and therein isomerizing said normal paraffin with the aid of said catalyst during the alkylation of the isobutane, whereby to increase the antiknock value of the straight-run gasoline fraction and form a substantially saturated aviation fuel comprising isomerized and alkylated paraffines including 2,3-dimethylbutane.

2. In the alkylation of isobutane with etheylene in a reaction zone in the presence of an aluminum chloride catalyst, the improvement which comprises introducing to said zone simultaneously with the isobutane a normally liquid predominantly paraffinic straight-run gasoline fraction containing a normal paraffin of at least 5 carbon atoms to the molecule and therein isomerizing said normal paraffin with the aid of said catalyst during the alkylation of the isobutane, whereby to increase the antiknock value of the straight-run gasoline fraction and form a substantially saturated aviation fuel comprising isomerized and alkylated paraffins including 2,3-dimethylbutane.

ROLAND B. DAY.